United States Patent [19]

Cieplik et al.

[11] 4,048,641
[45] Sept. 13, 1977

[54] MECHANISM TO OPEN AND CLOSE IRIS ON LENS

[75] Inventors: Robert J. Cieplik, Mount Lakes; Victor Czarnecki, Madison, both of N.J.

[73] Assignee: Addressograph Multigraph Corporation, Cleveland, Ohio

[21] Appl. No.: 695,967

[22] Filed: June 14, 1976

[51] Int. Cl.$^2$ .......................................... G03B 23/00
[52] U.S. Cl. ...................................... 354/10; 354/196; 355/58; 355/71
[58] Field of Search ................... 354/5, 10, 13, 196, 354/270; 355/71, 58

[56] References Cited

U.S. PATENT DOCUMENTS

| | | | |
|---|---|---|---|
| 2,670,665 | 3/1954 | Caldwell | 354/13 |
| 3,314,350 | 4/1967 | Husum | 355/58 X |
| 3,883,244 | 5/1975 | Whitaker et al. | 355/71 |
| 4,008,480 | 2/1977 | Szabo | 354/5 |

FOREIGN PATENT DOCUMENTS 912,017  12/1962  United Kingdom ................ 354/270

Primary Examiner—John Gonzales
Attorney, Agent, or Firm—Ray S. Pyle

[57] ABSTRACT

Some photocomposition machines use optics with a variable magnification lens, usually referred to as a variator lens. Because larger size print requires more lumens of power for proper exposure of the photosensitive sheets used in photocomposition machines, the common practice is to employ an iris diaphragm which is coordinated with the size of the projected image. The ratio of the diaphragm opening to the focal length is referred to as the $f$-number.

The invention shows an improved cam operated iris control wherein the cam-to-follower pressure angle is maintained at a minimum and provides a means for enabling the cam follower to traverse the entire cam without binding as the cam follower carriage is moved relative to the driving cam.

3 Claims, 4 Drawing Figures

MECHANISM TO OPEN AND CLOSE IRIS ON LENS

BACKGROUND OF THE INVENTION

Photocomposition is a specific form of photography. The basic principles of using the illumination of an incandescent lamp to project through a transparency, employing lenses for focusing, is also employed in most types of photocomposition machines.

As size change of the projected image became desirable in photocomposition, various approaches have been followed. One is simply to change the lenses. Some machines employ turret mounted lenses for this purpose.

The Addressograph-Multigraph Corporation, incorporated in the State of Delaware, U.S.A., has developed and marketed a photocomposition machine employing a variable size image projection accomplished by a variator lens shiftable along the optical axis of the projected image by means of a lens carriage. In order to accomplish uniform illumination of the image, an, iris diaphragm is employed using a laterally positioned cam with an iris actuating cam follower riding the cam.

Such cam and cam follower actuation of an iris diaphragm is a known technique in the photographic art. As long as the angle of the cam is small with respect to the direction of rotation of the cam follower, direct iris control by a laterally positioned cam will be operative.

However, in order to provide a photocomposition machine from about 4½-point to 74-point character size, the pressure angle between a direct action follower arm and an actuating cam becomes so large that binding occurs. Pressure angle is defined as that angle (at any point) between the normal to the pitch curve of the cam and the instantaneous direction of the follower motion.

SUMMARY OF THE INVENTION

The principal advantage obtained by this invention is the ability to automate the setting of an iris diaphragm by means of a laterally positioned cam track, through a range of $f$-numbers from $f/18$ to $f/3$, producing a point size within a range from about 5½-point to 74-point.

A further advantage and object is to substantially eliminate need for spring pressure to hold an iris diaphragm arm against a follower. Very little spring pressure is able to deflect seemingly sturdy structural parts, and slight deflection is greatly magnified in projection of large characters from character font discs which are in about a 16.444:1 ratio to the final projection size.

DESCRIPTION OF THE PREFERRED EMBODIMENT

Figure 1:
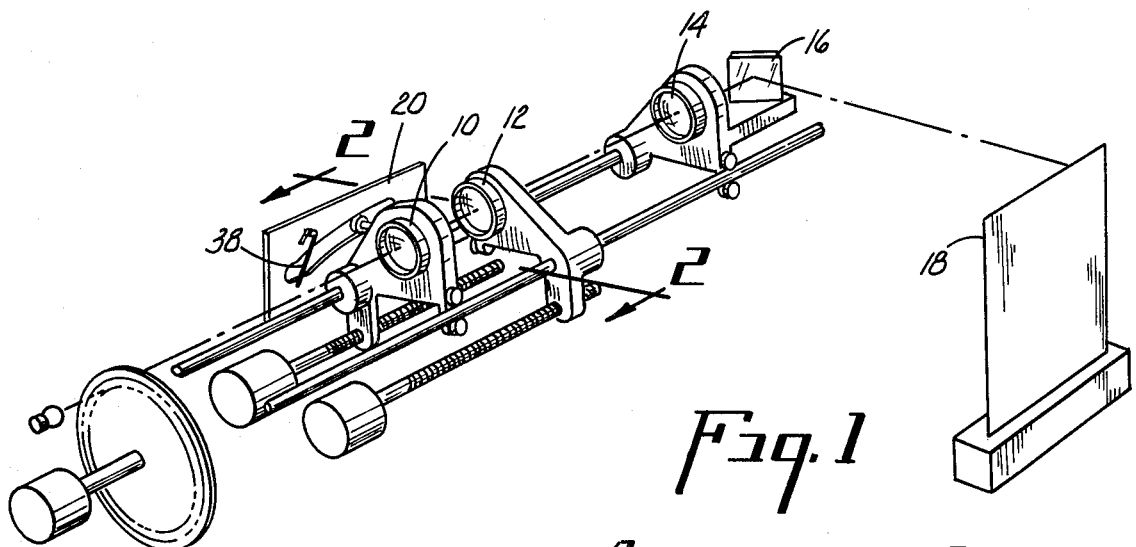
FIG. 1 is a perspective schematic of a photocomposition machine optical system.

FIG. 1 is a perspective, substantially schematic illustration of a commercially available optical system with type font for a photocomposition machine. This particular machine employs a variator lens 10. A variator lens is a focusing lens which produces a variable size aerial image which is projected into the collimating lens 12 and refocused by a decollimating lens 14. The optical axis is turned at 90° by mirror 16 which is carried in unison with the decollimating lens 14 on a common carriage. This collimating and decollimating portion of the system is essentially that of the Caldwell U.S. Pat. No. 2,670,665.

Whenever size changing is provided in an optical system of this type, the amount of radiant energy transmitted by the lens must be adjusted in accordance with the area of the image to be projected upon a sheet of photosensitive material 18. Adjustment is normally accomplished by an iris diaphragm that can be turned by a ring so as to change the diameter of a central opening.

Figure 2:
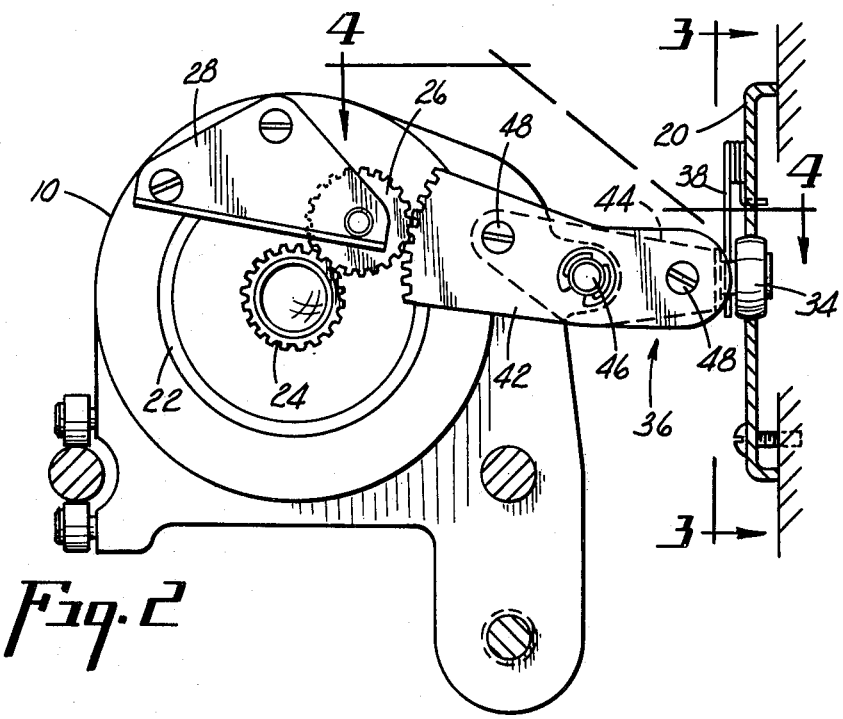
FIG. 2 is a section view taken along line 2—2 of FIG. 1.

The FIG. 1 illustration suggests the presence of a diaphragm operating by cam actuation. The iris structure is located on the side of the lens carriage 10 out of view in FIG. 1 but is shown in FIG. 2. The cam structure is visible in FIG. 1 and is represented by reference character 20. See FIG. 2 for details of the iris structure and the operating mechanism of this invention.

The iris diaphragm is a conventional well known mechanism available for a wide variety of photographic equipment, and hence is not shown in greater detail with respect to internal operating construction. An iris ring 22 is equipped with an iris gear 24. An idler gear 26 is mounted on bracket 28 to place the gear 26 in driving mesh with gear 24.

It is essential that the iris diaphragm be moved responsively to the position of the focusing variator lens 10 in order to avoid necessity for manual setting of the iris, or the provision of a more expensive computer controlled drive system. In past practice, whenever the point size change has been within a range of about 5½-point to 32-point, requiring a change from about $f/18$ to $f/6$, a conventional iris ring with a fixed projecting follower arm has been satisfactorily employed with a cam acting to drive the follower arm with a spring loading the iris to hold the arm against the cam. This arrangement was operative up to a maximum of 60° of rotation. If a greater movement were attempted, the pressure angle, defined as that angle between the normal to the pitch curve of the cam and the instantaneous direction of the follower member exceeded 40°, binding of the follower arm resulted. An attempt was made to keep the pressure angle below 40° by using a spring loaded iris with a wrap-around cable operated by a pivoted follower arm. This system tended to bind the lens mechanism when the cam follower arm moved to its extreme position. The forces that bound such mechanism were due to the spring required to keep the lens loaded to the follower arm and the change in force direction due to the arc of the follower arm.

Whenever point sizes are kept within a range not exceeding about 32-point, a normal 2 mm height character on a font disc can be projected to a 32-point size without the spring loading of the lens carriage producing enough distortion to be detrimental. This enlargement is in a ratio of about 7:1.

However, whenever the magnification goes beyond the magnification suggested by the 7:1 ratio, a very slight yielding of the carriage way rods and the iris structure is unavoidable if sufficient spring pressure is used to keep the follower arm properly loaded to the cam. This invention provides a solution wherein no spring pressure is necessary.

The cam 20 is a flat plate member mounted to extend along side the lens carriage and is slotted to provide a pair of surfaces 30 and 32. The surface 30 is a generated cam surface and the surface 32 is a confining surface. The two surfaces are closely spaced to a clearance of about 0.08 mm with respect to a follower wheel 34 carried by a follower arm 36.

Figure 3:
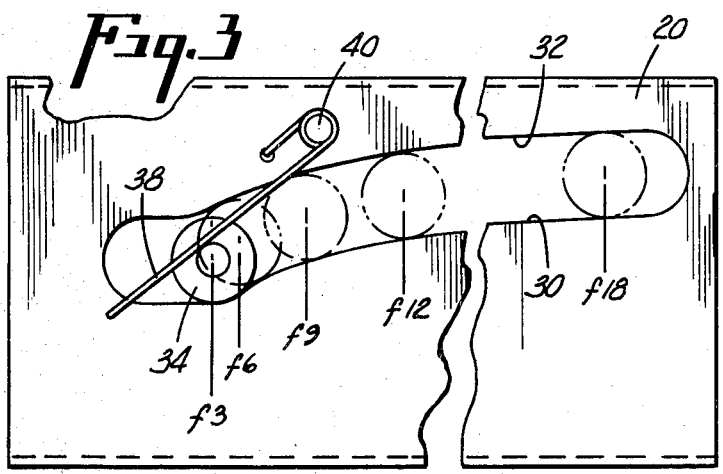
FIG. 3 is an elevational view of the control cam taken along line 3—3 of FIG. 2.
Figure 4:
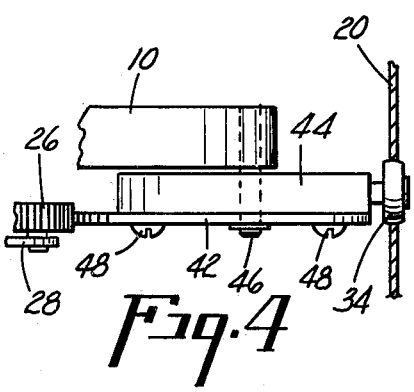
FIG. 4 is a top view taken along line 4—4 of FIG. 2.

The FIG. 3 illustrates the actual generated curvature of a cam surface 30 and it will be seen that beyond the f/9 range, the curve becomes progressively steeper until just beyond f/6, where the curve flattens out to the f/3 maximum position.

In producing the confining surface 32, it was found that the curvature at the higher point position made the close confinement of the follower wheel 34 impossible. Hence, in the larger range, the confining surface 32 diverges and allows the wheel to float free of that surface. Then, to maintain the wheel 34 in proper contact with the generated cam surface, a spring 38 is looped over a pin 40 and caused to ride the axle of the wheel 34 in the extreme area only. It should be noted that this spring pressure does not produce a loading of the lens carriage and way rods as would be accomplished by the prior art of loading the iris directly to keep a follower on the cam surface.

The follower arm 36 is a composite member in the preferred embodiment, comprising a gear segment portion 42 and a follower arm section 44. These members are pivoted about a common pivot 46, and bound together by means of gear segment screws 48. The iris diaphragm is adjusted by loosening the members 42 and 44 and adjusting the iris opening by rotating the gear train with the follower arm remaining captured in the cam guide slot whereafter the screws 48 are retightened.

What is claimed is:

1. A cam and cam follower lens system, comprising: a lens, an iris diaphragm that can be turned by a ring so as to change the diameter of a central opening, said diaphragm and lens mounted on a carriage in juxtaposition whereby the diaphragm effectively controls the aperture of the lens;
   an iris diaphragm ring having a drive receiving gear configuration, an idler gear engaged with said diaphragm gear;
   a follower arm having a first end which is a gear segment and a second end which is a cam follower wheel, a means for pivotally mounting said arm with the gear segment engaged with said idler gear;
   a cam track means for driving said follower arm and iris diaphragm to a predetermined aperture opening by moving said carriage along a path paralleling said cam track, said cam track means consisting of a pair of surfaces, one of said surfaces being a generated cam surface and the other being a confining surface, said surfaces closely spaced to a clearance of about 0.08 mm with respect to said follower wheel throughout a calculated f-number range wherein the pressure angle of the cam surface and wheel is not greater than 40°, said other one of said spaced surfaces diverging to release said wheel in areas wherein an abrupt change of cam slope would otherwise result in a binding of the wheel, and
   means for engaging said follower wheel end to apply pressure to hold said wheel against the cam surface only in said released area.

2. A cam and cam follower lens system, comprising:
   a lens, an iris diaphragm that can be turned by a ring so as to change the diameter of a cnetral opening, said diaphragm and lens mounted on a carriage in juxtaposition whereby the diaphragm effectively controls the aperture of the lens;
   way rods defining a carriage track and means mounting said carriage for longitudinal movement on said track;
   said iris diaphragm ring having a drive receiving gear configuration, an idler gear engaged with said diaphragm gear;
   a follower arm having a first end which is a gear segment and a second end which is a cam follower wheel, a means for pivotally mounting said arm with the gear segment engaged with said idler gear;
   a cam plate extending parallel to said track, said plate having a guide slot which captures said wheel loosely held, said slot and wheel limited to a pressure angle of not more than 40°.

3. The auto-focus lens system of claim 2 wherein the follower arm is a composite of the gear segment as one unit and the cam follower wheel as a separate segment, the composite members mounted on a common pivot, and means to bind the segments together in adjustably selected angular relationship about the pivot, whereby the iris diaphragm is adjusted by loosening the members and adjusting the iris opening by rotating the gear train with the follower arm remaining captured in the cam guide slot.

* * * * *

UNITED STATES PATENT AND TRADEMARK OFFICE
CERTIFICATE OF CORRECTION

PATENT NO. : 4,048,641
DATED : September 13, 1977
INVENTOR(S) : Ronald J. Cieplik and Victor Czarnecki It is certified that error appears in the above-identified patent and that said Letters Patent are hereby corrected as shown below:

The name of the first inventor should read: Ronald J. Cieplik instead of Robert J. Cieplik.

Signed and Sealed this

Seventeenth Day of January 1978

[SEAL]

Attest:

RUTH C. MASON
Attesting Officer

LUTRELLE F. PARKER
Acting Commissioner of Patents and Trademarks